(12) United States Patent
Kim

(10) Patent No.: US 12,427,840 B2
(45) Date of Patent: Sep. 30, 2025

(54) AIR PURIFIER FOR VEHICLE

(71) Applicant: HYUNDAI MOBIS Co., Ltd., Seoul (KR)

(72) Inventor: Seung Cheol Kim, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 50 days.

(21) Appl. No.: 17/486,091

(22) Filed: Sep. 27, 2021

(65) Prior Publication Data
US 2022/0097492 A1     Mar. 31, 2022

(30) Foreign Application Priority Data

Sep. 28, 2020    (KR) .................. 10-2020-0126304

(51) Int. Cl.
    *B60H 3/06*          (2006.01)
    *B60H 1/00*          (2006.01)

(52) U.S. Cl.
CPC ....... *B60H 3/0608* (2013.01); *B60H 1/00521* (2013.01); *B60H 1/00985* (2013.01); *B60H 2003/065* (2013.01)

(58) Field of Classification Search
CPC .............. B60H 3/0608; B60H 1/00521; B60H 1/00985; B60H 3/0658; B60H 1/00471;
(Continued)

(56) References Cited

U.S. PATENT DOCUMENTS 6,102,660 A *   8/2000   Lee ...................... B60H 3/0028
                                                               454/157
7,322,881 B2 *   1/2008   Ishii ...................... B41J 29/377
                                                               399/92
(Continued)

FOREIGN PATENT DOCUMENTS

CN        205800733 U   *   12/2016
CN        207173240 U       4/2018
(Continued)

OTHER PUBLICATIONS

Aprilaire. New Filter Grille Air Cleaners, Aprilaire Partners, Madison, WI, 2019. (Year: 2019).*

(Continued)

*Primary Examiner* — Allen R. B. Schult
*Assistant Examiner* — Illiam C Weinert
(74) *Attorney, Agent, or Firm* — NSIP Law

(57) ABSTRACT

An air purifier having a shape and structure suitable for application to a vehicle interior are disclosed where the air purifier for a vehicle, includes an exterior housing having an open outlet configured to discharge purified air, a blower fan configured to rotate inside the exterior housing, to suction air into the exterior housing, and to blow the purified air to the outlet, a filter configured to purify the air suctioned into the exterior housing a fan support configured to support the blower fan, fixe the blower fan to the exterior housing, and having a plurality of holes through which air purified by the filter moves to the blower fan, and a mesh cover fixed at a position in which the air is suctioned into the exterior housing, the mesh cover having a plurality of holes formed therein and having a filter mount on which the filter is mounted.

15 Claims, 4 Drawing Sheets

(58) Field of Classification Search
CPC ............ B60H 2003/065; B60H 1/0025; B60H 1/00264; B60H 1/3421; B60H 1/0065; B60H 1/00671; B60H 2001/3478
USPC ..................................................... 454/156
See application file for complete search history.

(56) References Cited

U.S. PATENT DOCUMENTS

| | | | | |
|---|---|---|---|---|
| 8,475,119 | B2* | 7/2013 | Li | H05K 7/20181 361/679.48 |
| 10,179,542 | B1* | 1/2019 | Salter | G08B 5/38 |
| 11,179,995 | B2* | 11/2021 | Nakashima | B60H 1/3421 |
| 2004/0118288 | A1* | 6/2004 | Kim | F24F 11/62 96/417 |
| 2010/0207407 | A1* | 8/2010 | Walker, Jr. | F24F 13/28 294/210 |
| 2013/0306300 | A1* | 11/2013 | Welsch | F04D 29/5826 165/200 |
| 2015/0114893 | A1* | 4/2015 | Moll | E03F 5/16 210/170.03 |
| 2016/0047559 | A1* | 2/2016 | Swanson | F24F 1/04 62/401 |
| 2020/0149755 | A1* | 5/2020 | Yan | F24F 1/02 |
| 2020/0171921 | A1* | 6/2020 | Matsuura | B60H 1/241 |
| 2020/0307348 | A1* | 10/2020 | Kobayashi | B60H 1/00 |
| 2023/0001123 | A1* | 1/2023 | Tan | A61M 16/0616 |

FOREIGN PATENT DOCUMENTS

| | | | |
|---|---|---|---|
| CN | 108248344 | A * | 7/2018 |
| CN | 212777789 | U * | 3/2021 |
| JP | H09215740 | A * | 8/1997 |
| JP | 2000-177379 | A | 6/2000 |
| KR | 10-2013-0142451 | A | 12/2013 |
| KR | 10-1739195 | B1 | 5/2017 |
| KR | 10-2019-0070789 | A | 6/2019 |

OTHER PUBLICATIONS

D'Sa, Francis. "Kent Magic Hepa Pure Car Air Purifier Review: Helps Keep Your Car Air Clean." The Asian Age, The Asian Age, Jan. 26, 2019, www.asianage.com/technology/gadgets/260119/kent-magic-hepa-pure-car-air-purifier-review-helps-keep-your-car-air-clean.html. (Year: 2019).*
Korean Office Action issued on Jul. 7, 2025, in counterpart Korean Patent Application No. 10-2020-0126304. (9 pages in Korean).

* cited by examiner (A)

(B)

AIR PURIFIER FOR VEHICLE

CROSS-REFERENCE TO RELATED APPLICATION

This application claims the benefit under 35 USC § 119(a) of Korean Patent Application No. 10-2020-0126304, filed on Sep. 28, 2020, in the Korean Intellectual Property Office, the entire disclosure of which is incorporated herein by reference for all purposes.

BACKGROUND

1. Field

The present disclosure relates to an air purifier for a vehicle, and more particularly, to an air purifier that is installed in a cockpit module package to purify the air in a vehicle.

2. Discussion of Related Art

Interest in antibacterial activity, sterilization, and air purification in vehicle interiors is increasing worldwide. The number of users who purchase and use air purifiers for a vehicle or portable air purifiers as a way to keep vehicle interiors clean is rapidly increasing. Air purifiers used in vehicles serve to suction and purify air from air vents of air conditioners as well as indoor air and outdoor air and discharge the purified air to the vehicle interiors.

However, when the users need to separately purchase a portable air purifier to purify air after a vehicle is released, the air purifier should be separately mounted at a position such as a cup holder, headrest, or legroom. Thus, inconvenience in space should be accepted, a separate power line should be drawn, and interior design sensibility already applied to the vehicle is hindered.

Further, since it is not yet common to include the air purifiers in vehicle manufacturing and a lot of modules and functions have already been applied to the vehicle interiors, the air purifiers should be designed separately.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an air purifier for a vehicle, including an exterior housing having an open outlet configured to discharge purified air, a blower fan configured to rotate inside the exterior housing, to suction air into the exterior housing, and to blow the purified air to the outlet, a filter configured to purify the air suctioned into the exterior housing a fan support configured to support the blower fan, fixe the blower fan to the exterior housing, and having a plurality of holes through which air purified by the filter moves to the blower fan, and a mesh cover fixed at a position in which the air is suctioned into the exterior housing, the mesh cover having a plurality of holes formed therein and having a filter mount on which the filter is mounted.

The blower fan may include a plurality of wings disposed on a circumferential surface thereof, and the air introduced into the exterior housing by the rotation of the blower fan may be collected at a lower portion of the blower fan, a flow direction of the air may be changed by the plurality of wings, and the air may be discharged radially.

The air purifier may include an opening mechanism configured to open the mesh cover from the exterior housing to expose the filer.

The opening mechanism may include a lock configured to fasten the mesh cover to a bezel located at the outlet, and a hinge that may be located on a side opposite to the lock and configured to rotate the mesh cover.

The mesh cover may be configured to be opened by any one or any combination of a weight of the mesh cover and an electro-mechanism.

The user operations and information display of the air purifier may be performed by an audio/video/navigation (AVN) in a vehicle.

In another general aspect, there is provided an air purifier for a vehicle, including an exterior housing having an open outlet which configured to discharge purified air, a blower fan configured to rotate inside the exterior housing, to suction air into the exterior housing, and to blow the purified air to the outlet, a fan support configured to support the blower fan and to fix the blower fan to the exterior housing, a filter configured to purify the air suctioned into the exterior housing, a mesh cover fixed at a position in which the air is suctioned into the exterior housing, and an opening mechanism configured to open the mesh cover from the exterior housing to expose the filer, wherein the air is suctioned into the exterior housing through the mesh cover.

The blower fan may include a plurality of wings disposed on a circumferential surface thereof, and the air introduced into the exterior housing by the rotation of the blower fan may be collected at a lower portion of the blower fan, a flow direction of the air may be changed by the plurality of wings, and the air may be discharged radially.

A plurality of holes may be formed on the fan support to allow the air purified by the filter to travel to the blower fan.

A plurality of holes may be formed in the mesh cover.

The mesh cover may include a filter mount on which the filter is mounted.

The opening mechanism may include a lock configured to fasten the mesh cover to a bezel located at the outlet, and a hinge that may be located on a side opposite to the lock and configured to rotate the mesh cover.

The mesh cover may be configured to be opened by any one or any combination of a weight of the mesh cover and an electro-mechanism.

The user operations and information display of the air purifier may be performed by an audio/video/navigation (AVN) in a vehicle.

Other features and aspects will be apparent from the following detailed description, the drawings, and the claims.

BRIEF DESCRIPTION OF THE DRAWINGS

FIGS. 1 and 2 are structural views of an air purifier for a vehicle according to an embodiment of the present disclosure, wherein FIG. 1 is a side cross-sectional view, and FIG. 2 is a plan view.

Figure 1:
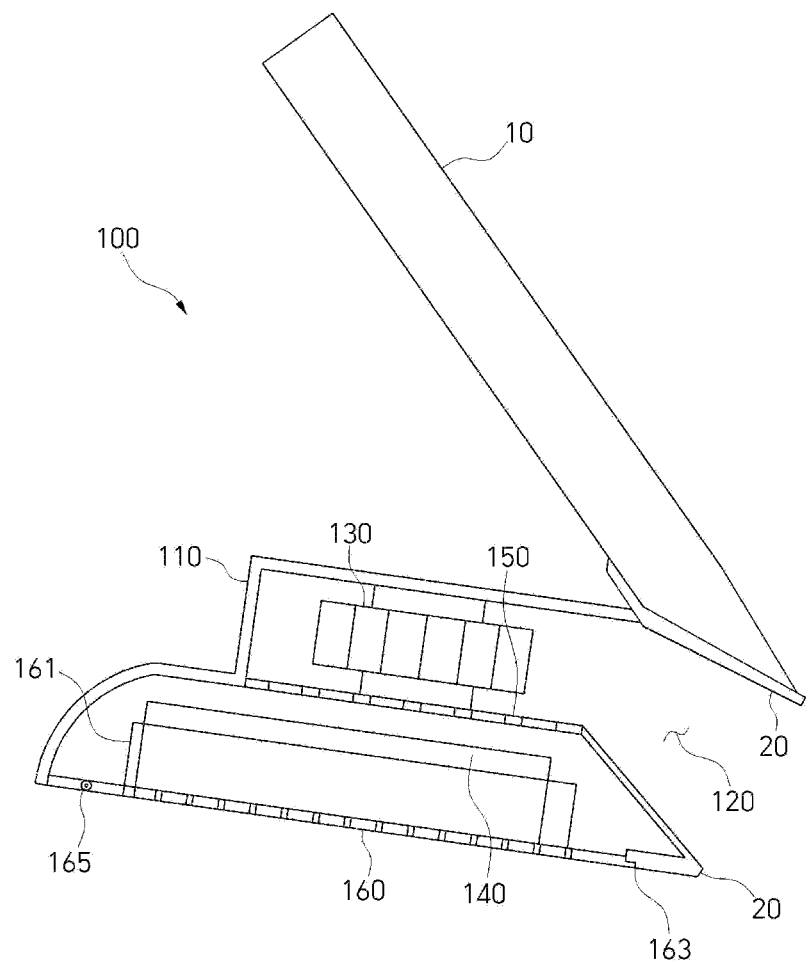

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Throughout the specification, when a component is described as being "connected to" or "coupled to" another component, it may be directly "connected to" or "coupled to" the other component, or there may be one or more other components intervening therebetween. In contrast, when an element is described as being "directly connected to" or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Basically, an air purifier for a vehicle according to the present disclosure includes a mesh cover through which air is suctioned, an air purification filter, and a blower fan. When the blower fan rotates and thus air is suctioned through the mesh cover behind the blower fan, the suctioned air is purified by the air purification filter and discharged by the blower fan.

The air purifier for a vehicle according to the present disclosure is installed under a center fascia of a cockpit module, for example, a center audio/video/navigation (AVN). A purified air outlet is exposed to the outside of the cockpit module, and an air purifier body is located inside the cockpit module. Since the air purifier according to the present disclosure is a separate air purification system that is not connected to the existing air conditioner, the air purifier may be installed at various positions according to the design as well as the center fascia of the cockpit module.

Figure 2:
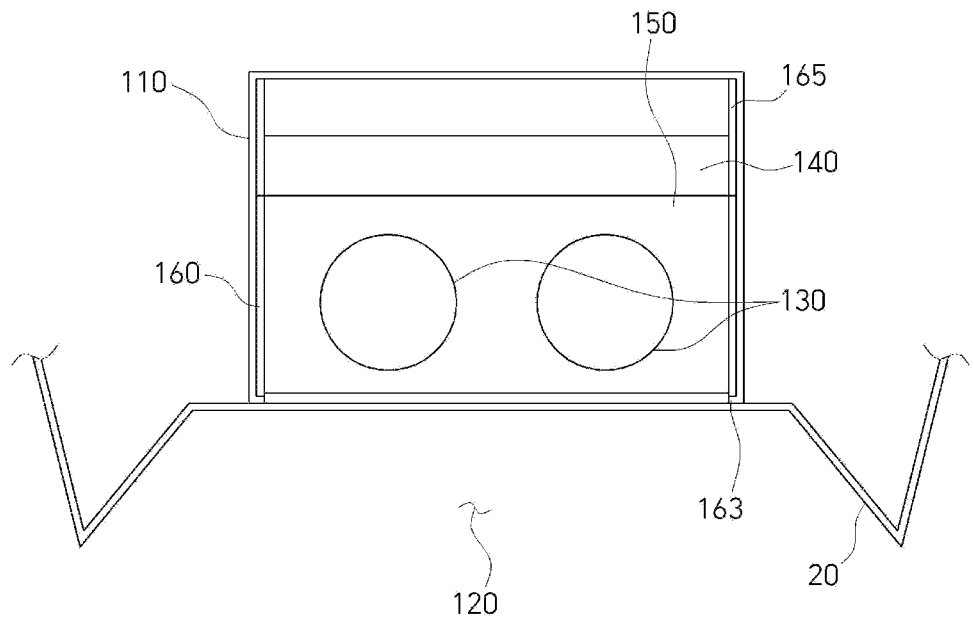

FIGS. 1 and 2 show structures of the air purifier for a vehicle according to an embodiment of the present disclosure, wherein FIG. 1 is a side cross-sectional view, and FIG. 2 is a plan view. In this embodiment, the air purifier designed to be modularized so as to be mounted on a lower position of an AVN monitor 10 of the cockpit module of the vehicle is exemplified.

In FIGS. 1 and 2, it may be seen that a purified air outlet 120 of an air purifier 100 mounted under the AVN monitor 10 of the cockpit module is exposed at the lower portion of the AVN monitor 10. A bezel 20 is located around the exposed outlet 120.

Components of the air purifier 100 according to the present embodiment are roughly as follows:
- an exterior housing 110 which is inserted into the bezel 20 of the cockpit module and in which an opening is formed so that a front surface thereof becomes the outlet 120 after the insertion;
- a blower fan 130 that rotates inside the exterior housing 110 to suction external air and blows purified air to the outlet 120; and
- a filter 140 that filters the air suctioned into the exterior housing 110.

From a structural viewpoint, a configuration of the air purifier 100 according to the present embodiment will be additionally described.

Referring to FIG. 2, it is shown that there are two blower fans 130, but the present disclosure is not limited thereto. The blower fan 130 is installed at an upper portion of the exterior housing 110 and is supported inside the exterior housing 110 by a fan support 150 located therebelow. A plurality of holes are formed in the fan support 150 to allow air (purified air) to be introduced into the blower fan 130 by the blower fan 130 (as will be described below).

A mesh cover 160 is installed at a lower portion of the exterior housing 110, that is, at an air suction part. The air suctioned into the exterior housing 110 by the rotation of the blower fan 130 is introduced into the exterior housing 110 through the mesh cover 160.

A plurality of holes are formed in the mesh cover 160 so that air is introduced into the exterior housing 110 (as will be described below). Further, the mesh cover 160 has a filter mounting part 161 on which the filter 140 may be mounted.

Meanwhile, the exterior housing 110 and/or the mesh cover 160 includes an opening mechanism for opening the mesh cover 160 from the exterior housing 110 in order to replace the filter 140. In the present embodiment, as the opening mechanism, a lock 163 detachably fastened to the bezel 20 and a hinge 165 located on a side opposite to the lock 163 are provided in the exterior housing 110 and/or the mesh cover 160.

Figure 3:
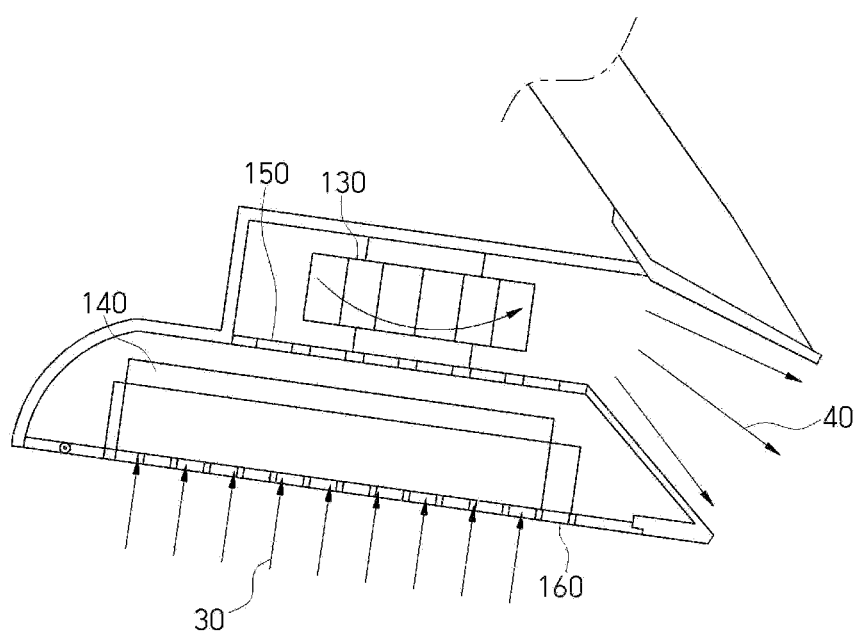
FIG. 3 is a conceptual diagram for describing the operation of an air purifier (100).

FIG. 3 is a view for describing the operation of the air purifier 100.

External air 30 is suctioned through the plurality of holes formed in the mesh cover 160 at the lower portion of the exterior housing 110 (see FIGS. 1 and 2) of the air purifier 100 built in the cockpit module. Here, the external air 30 includes vehicle interior air, external inflow air, air from an air conditioning system, or the like.

The suction of the external air 30 through the plurality of holes (as will be described below) formed in the mesh cover 160 is performed by the rotation of the blower fan 130 at the upper portion of the exterior housing 110. The external air 30 suctioned into the exterior housing 110 is purified by the filter 140 mounted on the filter mounting part 161 (see FIGS. 1 and 2) and continues to move upward by the blower fan 130.

Purified air 40 having passed through the plurality of holes (as will be described below) formed in the fan support 150 and then collected at a lower portion of the blower fan 130 is turned laterally by the blower fan 130 and is discharged into a vehicle through the outlet 120 on a front surface (surface facing a driver) of the cockpit module.

In this way, in order for the external air 30 to be introduced into the exterior housing 110 by the rotation of the blower fan 130, to pass through the filter 140, to be changed into the purified air 40, and to be discharged, the exterior housing 110 may be designed to have a significant sealing action, although not completely sealed, to exhibit the function of a conventional air purifier.

Figure 4:
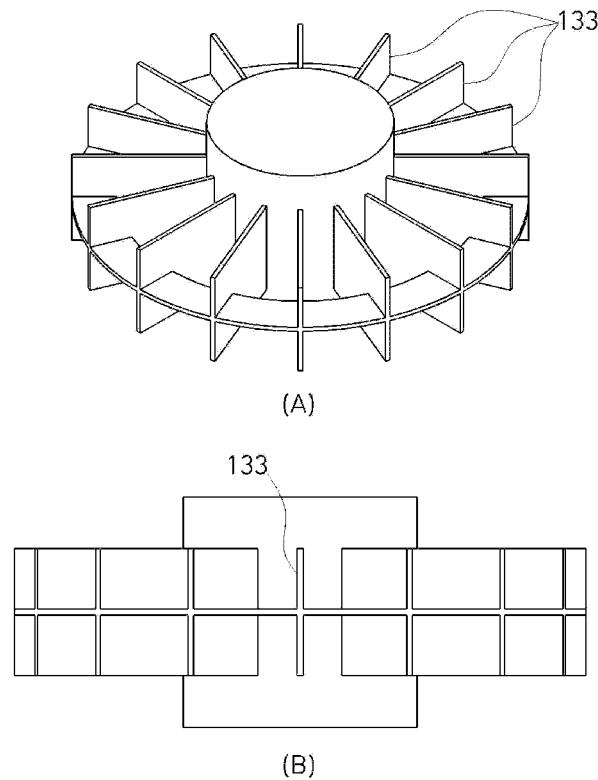
FIG. 4 shows an external view of a blower fan (130), wherein A is a perspective view and B is a side view.

FIG. 4 shows an external view of the blower fan 130, wherein A is a perspective view and B is a side view.

Since there are a plurality of wings 133 on a circumferential surface of the blower fan 130, the air introduced into the exterior housing 110 by the rotation of the blower fan 130 is collected at the lower portion of the blower fan 130, the flow direction of the air is changed by the plurality of wings 133, and the air is discharged radially (laterally).

Figure 5:
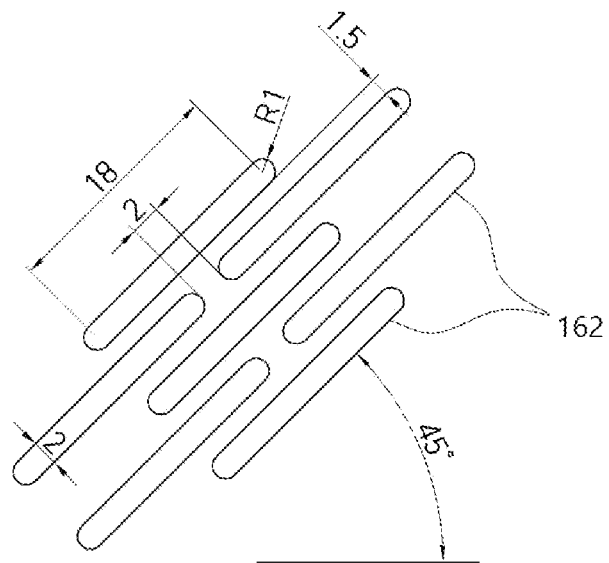
FIG. 5 is an exemplary view of a plurality of air suction holes (162) formed in a mesh cover (160).

FIG. 5 shows a plurality of air suction holes 162 formed in a mesh cover 160. For reference, dimensions regarding a size, an interval, and a shape of the holes are indicated.

The air suction hole 162 of the mesh cover 160 is a hole through which external air is suctioned into the exterior housing 110 and is designed to have an appropriate size according to the performance of the blower fan 130, a desired air volume, and the like. The pattern of the air suction hole 162 shown in FIG. 5 is designed to form an air suction hole having a larger cross-sectional area than other patterns so that as much external air as possible is suctioned.

Figure 6:
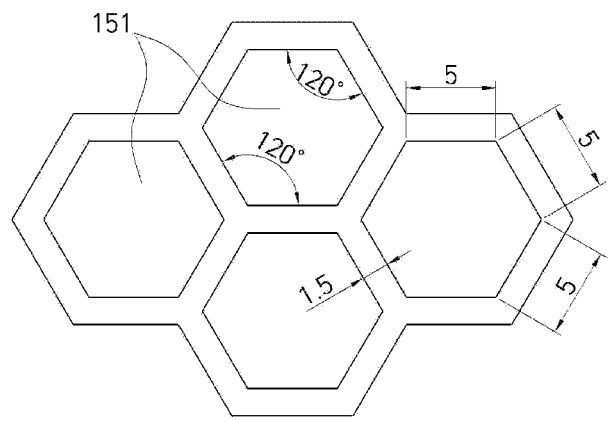
FIG. 6 is an exemplary view of air passage holes (151) formed in a fan support (150).

FIG. 6 shows air passage holes 151 formed in the fan support 150. For reference, dimensions regarding a size, an interval, and a shape of the holes are expressed.

The air passage hole 151 formed in the fan support 150 is a hole serving as a passage through which the purified air passing through the filter 140 below the blower fan 130 is collected in the lower portion of the blower fan 130.

In FIG. 6, hexagonal holes are arranged upward, downward, leftward, and rightward, so that sides thereof are in contact with each other, to achieve a maximum air passage area. These air passage hole 151 are also designed to have an appropriate size according to the performance of the filter 140 and the blower fan 130.

Figure 7:
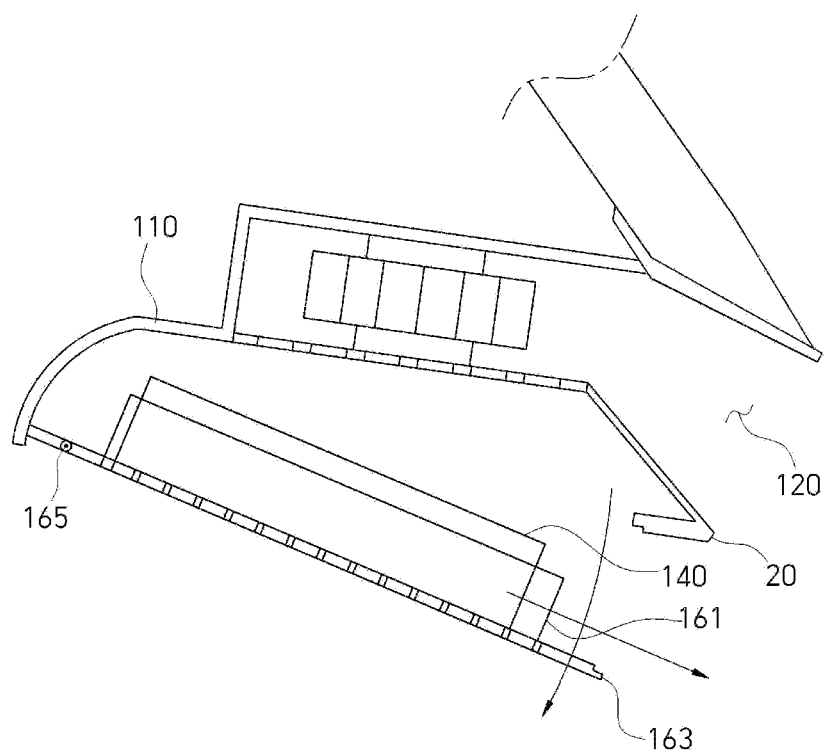
FIG. 7 shows opening a mesh cover (160) to replace a filter (140).

FIG. 7 shows a structure in which the mesh cover 160 is opened from the exterior housing in order to replace the filter 140.

When the lock 163, which is included in the opening mechanism included in the exterior housing 110 and/or the mesh cover 160 and fastens the bezel 20 below the outlet 120 and a front side of the mesh cover 160, is released, the mesh cover 160 rotates about the hinge 165, which is another part of the opening mechanism and is located behind the mesh cover 160, and thus the front side thereof moves downward and opens. Accordingly, the filter mounting part 161 is exposed at the front surface of the cockpit module, and thus the filter 140 can be easily replaced.

The operation of opening the front side of the mesh cover 160 may be performed by a weight thereof or may be performed by an electro-mechanism, e.g., electro-mechanical unit.

In another embodiment, although not shown, a control circuit board for user operations (functioning on/off, time setting, air purification mode selection, and the like) and displaying various pieces of information (air quality, air purification rate, filter replacement guidance, and the like) of the air purifier according to the present disclosure may be built in the air purifier having the above-described configuration or may be designed to be operated and displayed on a touch panel monitor by being connected to the AVN previously included in the vehicle.

According to the present disclosure, the quality of air inside a vehicle is improved by an inherent function of an air purifier.

Further, the air purifier can be applied to the inside of a cockpit module, thereby improving design quality, and an outlet of the air purifier can be applied to a center fascia, especially, a center air vent below an AVN monitor, thereby increasing the sense of luxury and user convenience. Further, in conjunction with the AVN, the air purifier can be operated and various pieces of information can be visualized.

The cockpit module built-in air purifier according to the present disclosure can not only improve air quality by purifying air introduced from the outside but also purify winds of an air conditioner discharged through an HVAC, a connection duct, and an air vent once again.

In order to apply an air purifier to a vehicle interior during vehicle manufacturing, the air purifier is designed as a small module having a low height, has a structure for easy replacement of a filter, and is built in the existing cockpit module package, thereby increasing utilization of a vehicle interior space and improving interior design sensibility or quality.

A structure in which the built-in air purifier according to the present disclosure may be applied to the existing cockpit module package and a structure in which the filter may be easily replaced are provided. The built-in location may be a center fascia (for example, near an air vent below AVN (audio/video/navigation)), but the present disclosure is not limited thereto.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An air purifier for a vehicle, comprising:
   a housing having an outlet configured to discharge purified air;
   a blower fan configured to rotate inside the housing, to suction air into the housing, and to blow the purified air to the outlet;
   a filter configured to purify the air suctioned into the housing;
   a fan support fixed to the housing and being configured to support the blower fan and fix the blower fan to the housing, the fan support comprising a plurality of hexagon-shaped holes, arranged so that sides thereof are in contact with each other, through which air purified by the filter moves to the blower fan; and
   a mesh cover fixed to the housing at a position in which the air is suctioned into the housing, the mesh cover having a plurality of holes formed therein, and having a filter mount extending therefrom on which the filter is mounted,
   wherein the housing is disposed in a cockpit module of the vehicle,
   wherein the fan support is disposed between the mesh cover and the blower fan, and
   wherein the housing is mounted to an audio/video/navigation (AVN) monitor of the vehicle, and the outlet is disposed adjacent the AVN monitor.

2. The air purifier of claim 1, wherein the blower fan comprises a plurality of wings disposed on a circumferential surface thereof, and
   wherein the air introduced into the housing by the rotation of the blower fan is collected at a lower portion of the blower fan, a flow direction of the air is changed by the plurality of wings, and the air is discharged radially.

3. The air purifier of claim 1, further comprising an opening mechanism configured to open the mesh cover from the housing to expose the filter.

4. The air purifier of claim 3, wherein the opening mechanism comprises:
   a lock configured to fasten the mesh cover to a bezel located at the outlet; and
   a hinge that is located on a side opposite to the lock and configured to rotate the mesh cover.

5. The air purifier of claim 3, wherein the mesh cover is configured to be opened by any one or any combination of a weight of the mesh cover and an electro-mechanism.

6. The air purifier of claim 1, wherein user operations and information display of the air purifier are performed by the audio/video/navigation (AVN) monitor in the vehicle.

7. The air purifier of claim 1, wherein the housing is configured to be separately mountable in one of a plurality of positions in the vehicle.

8. The air purifier of claim 1, wherein the housing is configured to be installed under a center fascia of a cockpit module.

9. An air purifier for a vehicle, comprising:
   a housing having an outlet configured to discharge purified air;
   a blower fan configured to rotate inside the housing, to suction air into the housing, and to blow the purified air to the outlet;
   a fan support fixed to the housing and being configured to support the blower fan and to fix the blower fan to the housing, wherein the fan support comprises a plurality of hexagon-shaped holes arranged so that sides thereof are in contact with each other through which air moves to the blower fan;
   a filter configured to purify the air suctioned into the housing;
   a mesh cover fixed to the housing at a position in which the air is suctioned into the housing, and having a filter mount extending therefrom on which the filter is mounted; and
   an opening mechanism configured to open the mesh cover from the housing to expose the filter,
   wherein the air is suctioned into the housing through the mesh cover,
   wherein the housing is disposed in a cockpit module of the vehicle,
   wherein the fan support is disposed between the mesh cover and the blower fan, and
   wherein the housing is mounted to an audio/video/navigation (AVN) monitor of the vehicle, and the outlet is disposed adjacent the AVN monitor.

10. The air purifier of claim 9, wherein the blower fan comprises a plurality of wings disposed on a circumferential surface thereof, and
    wherein the air introduced into the housing by the rotation of the blower fan is collected at a lower portion of the blower fan, a flow direction of the air is changed by the plurality of wings, and the air is discharged radially.

11. The air purifier of claim 9, wherein a plurality of holes are formed on the fan support to allow the air purified by the filter to travel to the blower fan.

12. The air purifier of claim 9, wherein a plurality of holes are formed in the mesh cover.

13. The air purifier of claim 9, wherein the opening mechanism comprises:
    a lock configured to fasten the mesh cover to a bezel located at the outlet; and
    a hinge that is located on a side opposite to the lock and configured to rotate the mesh cover.

14. The air purifier of claim 9, wherein the mesh cover is configured to be opened by any one or any combination of a weight of the mesh cover and an electro-mechanism.

15. The air purifier of claim 9, wherein user operations and information display of the air purifier are performed by the audio/video/navigation (AVN) monitor in the vehicle.

* * * * *